United States Patent [19]
Gravesteijn et al.

[11] Patent Number: 4,808,514
[45] **Date of Patent: * Feb. 28, 1989**

[54] METHOD FOR THE OPTICAL RECORDING OF INFORMATION AND AN OPTICAL RECORDING ELEMENT USED IN THE METHOD

[75] Inventors: Dirk J. Gravesteijn; Carolus J. van der Poel, both of Eindhoven, Netherlands

[73] Assignee: U.S. Philips Corporation, New York, N.Y.

[ * ] Notice: The portion of the term of this patent subsequent to Mar. 3, 2004 has been disclaimed.

[21] Appl. No.: 942,659

[22] Filed: Dec. 17, 1986

Related U.S. Application Data

[63] Continuation-in-part of Ser. No. 831,781, Feb. 21, 1986, Pat. No. 4,647,944.

[30] Foreign Application Priority Data

Nov. 5, 1985 [NL] Netherlands ........................ 8503235

[51] Int. Cl.$^4$ ................................................ G03C 1/72
[52] U.S. Cl. .................................... 430/495; 430/346; 430/945; 430/964; 346/135.1

[58] Field of Search ................. 430/19, 495, 346, 945, 430/964; 346/135.1, 76 L

[56] References Cited

U.S. PATENT DOCUMENTS 4,647,944 3/1987 Gravesteijn et al. ............... 430/945

FOREIGN PATENT DOCUMENTS 0184452 6/1986 European Pat. Off. ............ 430/945
0177446 9/1985 Japan .................................. 430/495

*Primary Examiner*—Paul R. Michl
*Assistant Examiner*—Lee C. Wright
*Attorney, Agent, or Firm*—Norman N. Spain

[57] ABSTRACT

A method is provided for the optical recording of information in which an amorphous recording layer 4 having a composition according to formula (1) provided on a synthetic resin substrate (2) (FIG. 1) in a maximum layer thickness of 150 nm is exposed of infrared laser light having a wavelength of 750–900 nm and pulsed in accordance with the binary information to be recorded with a pulse time of at most 200 ns. A crystalline area 6 (bit) having maximum dimensions of a few micrometers is formed in the amorphous layer in the exposed places. As optical recording element is also provided for use in the method.

3 Claims, 1 Drawing Sheet

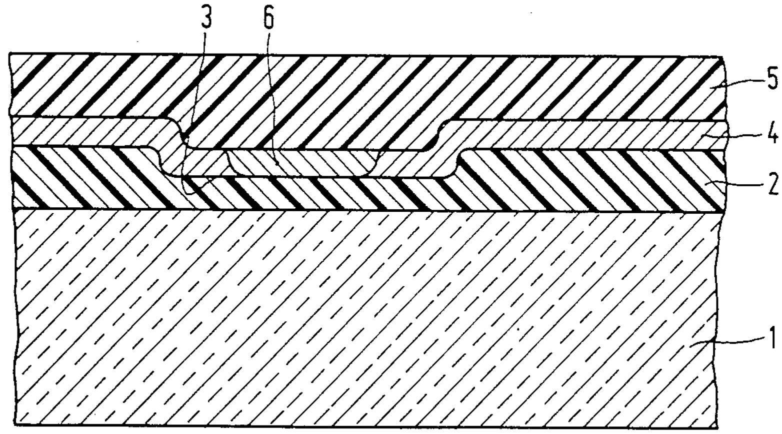
3
6
5
4
2
1

METHOD FOR THE OPTICAL RECORDING OF INFORMATION AND AN OPTICAL RECORDING ELEMENT USED IN THE METHOD

RELATED APPLICATIONS

The instant application is a continuation-in-part of Application Ser. No. 831,781, filed Feb. 21, 1986 and now U.S. Pat. No. 4,647,944.

BACKGROUND OF THE INVENTION

The invention relates to a method for the optical recording of information in which a recording element which comprises a substrate and a recording layer provided thereon is exposed to laser light which is modulated in accordance with the information to be recorded, in which an optically readable change in structure occurs in the recording layer in the exposed places which is read by means of laser light via the substrate on the basis of differences in reflection with the surroundings.

Various systems for such optical recording are known. A system which is interesting for practical applications is the so-called ablative system. In this system a recording layer of, for example, Bi, a TeSe alloy or a dye is used in which holes or cavities are formed upon exposure to light. The holes or cavitites are read by means of weak laser light on the basis of differences in reflection between a hole or cavity and the surrounding thereof.

A practical disadvantage is that an air gap must be present above such an ablative recording layer. In practice, two ablative recording elements are interconnected, the recording layers facing each other, and spacers being used in order to provide an air(c.q. gas) gap between the recording layers. Hence the recording layer cannot be provided with a protective coating layer, for example, a coating lacquer layer.

A second system of optical recording is the phase change system. The recording layer used in this system is a layer of a semiconductor material, notably a TeSe alloy, to which various other elements, for example, As, Sb, S, may be added. Upon exposure to laser light, a change in structure occurs in the exposed places, amorphous information bits being formed in a crystalline layer, or conversely. The system is reversible so that, for example, by exposure to laser light, the amorphous information bits are converted again into crystalline material. The phase change system is known inter alia from U.S. Pat. No. 3,530,441. For practical application of this system, for example in the case of a Te-Se-Sb recording layer, the starting material is a crystalline layer in which amorphous bits are formed reversibly. The recording layer is provided on a supporting plate (substrate) by means of a sputtering process. The initially amorphous recording layer must first of all be converted into a crystalline layer by a heat treatment. This presents problems when a synthetic resin supporting plate (substrate) is used because the synthetic resins cannot withstand a heat treatment of, for example, 120° C. for one hour. The recording layer must have a comparatively high crystallization temperature because otherwise the layer has insufficient stability and hence the stability of the recording element is restricted. The synthetic resin polymethyl methacrylate (PMMA) which, due to its low birefringence, is very suitable as such for use in a recording element is deformed and degraded by the temperature treatment. The synthetic resin polycarbonate acquires too large a birefringence as a result of the heat treatment. As a result of this the information recorded in the recording layer can no longer be read. Cross-linked synthetic resins, for example, the acrylate resins cross-linked by means of light, cannot withstand the above-mentioned temperature treatment either. The temperature treatment is an extremely critical process.

It is to be noted that reading takes place on the basis of difference in reflection of the reading laser light which is focused on the recording layer via the transparent substrate plate. The abovementioned disadvantage could possibly be avoided by not using the heat treatment and starting from an amorphous layer in which crystalline information bits are formed by exposure to radiation. However, this local crystallization is a slow process. In column 1, lines 60–65 of the abovementioned U.S. Pat. No. 3,530,441 a pulse duration of 1–100 milliseconds or more is mentioned to convert amorphous material locally into crystalline material.

SUMMARY OF THE INVENTION

It is an important object of the present invention to realize a recording pulse time of at most 200 ns (nanoseconds).

Another important object of the invention is to provide a method in which the recording layer is provided on a synthetic resin substrate and in which no damage or deformation of the synthetic resin occurs as a result of the exposure to pulsated laser light.

Still another object is to provide a high information density in which the recorded binary information bits have maximum dimensions of a few micrometers.

A further object is to provide a method in which the recorded informaton can be kept for a very long period of time, i.e. is not degraded in storage.

Still another object is to optically read the recorded information with a high signal-to-noise ratio.

According to the invention, these objects are achieved by means of a method of the type mentioned in the opening paragraph which is characterized in that an amorphous recording layer having the composition $$[R_x\text{—}Sb_{1-x}]_yQ_{1-y} \quad \text{(formula 1)}$$

wherein R is selected from the group formed by Ga and In,

Q is selected from the group formed by Se and Te, x=0.46–0.54 y=0.94–1.00 or mixtures thereof provided on a snythetic resin substrate in a maximum thickness of 150 nm is exposed to infrared laser light having a wavelength of 750–900 nm which is pulsated in accordance with the binary (digital) information to be recorded with a pulse time of at most 200 ns, a crystalline area (bit) with maximum dimensions of a few micrometers being formed in the amorphous layer in the exposed places.

BRIEF DESCRIPTION OF THE DRAWING

The sole FIGURE in the drawing is a cross-sectional view of an optical recording element of the invention.

DETAILED DESCRIPTION OF THE INVENTION

The above-mentioned amorphous recording layer of the invention is provided on the synthetic resin substrate by means of a sputtering process or a vapour deposition process. The sputtered or vapour-deposited layer is amorphous. The synthetic resin substrate is, for example, a synthetic resin substrate of polymethyl methacrylate of polycarbonate. The substrate may alternatively be manufactured, for example, from glass and be coated with a synthetic resin layer on which the recording layer is then provided. Such a synthetic resin layer is, for example, a layer of a UV light cured, monomer composition, for example, a mixture of mono-, di-, tri- and/or tetra-acrylates. A spiral-like groove may be provided in the synthetic resin substrate. As a result of this, the thin recording layer also has a groove. The groove serves for the control of the laser light beam. The groove, also termed servo track, may comprise servo data in the form of information (servo) areas which are situated alternatively at a higher level and at a lower level and which can be read optically. A suitable layer thickness of the recording layer is 60–150 nm. A suitable pulse time is, for example, 20–100 ns. The crystalline information areas (bits) obtained upon recording may be circular and have, for example, a diameter of 1 μm. Elongate bits may alternatively be formed having a longitudinal dimension which varies from approximately 0.5 to 3 μm. As a result of this, optical recording of binary, EFM modulated information is possible.

The recording layer can be protected in a simple manner from mechanical and/or chemical attack by directly providing on the surface of the layer a protective layer, for example a protective layer of a radiation-cured, for example UV-light-cured, lacquer of acrylic acid esters.

In the above formula (1) the value of x especially is an important parameter.

If a different value of x is chosen, for example, a lower value, other phenomena start playing a role when exposing to laser light. For illustration, reference is made to Japanese Kokai No. 60-177446. In this paper a group of recording material is described of the general formula $$(In_{1-x}Sb_x)_{1-y}M_y,$$

wherein

M=Au, Ag, Cu, Pb, Pt, Al, Si, Ge, Ga, Sn, Te, Se, Bi x=55–80 percent by weight y=0–20 percent by weight.

After exposure of this material, either a semi-stable paste, which is termed π-phase, or a mixed phase of InSb and Sb is formed in the exposed places dependent on the rate of cooling. The π-phase may be transformed into the mixed phase by heating. This type of optical recording in which there is switched between a mixed phase and a π-phase, has for its disadvantage that two components are involved in the transformation of the mixed phase. As a result of this, although according to the above Kokai repeated recording and erasing is possible, the number of times there can be erased and recorded is restricted. This is stability problem, which is not acceptable and not attractive for use in practice. Another disadvantage is that the speed of transformation of mixed phase to π-phase is limited because two components InSb and Sb are involved which must find each other in the good proportion before conversion takes place. A further disadvantage is the comparatively low signal-to-noise ratio, which does not enable video recording.

In a favourable embodiment of the method in accordance with the invention an amorphous recording layer of formula (1) is used in which R and y have the above-mentioned meanings, Q is the element tellurium and x=0.48–0.52.

Very good results are obtained in particular with a recording layer represented by the formula $Ga_xSb_{1-x}$, wherein x=0.48–0.52.

In particular in these favourable embodiments a very high signal-to-noise ratio is achieved. It has been found, for example, that a layer of the formula $(In_xSb_{1-x})_{95}Te_5$ and $(Ga_xSb_{1-x})_{95}Te_5$ produces a CNR (carrier-to-noise ratio) of 60 dB measured at a linear speed of 1.25 m/s, a pulse frequency of 700 kHz and a bandwidth of 10 kHz. A CNR of 62 dB has even reached with a recording layer of $Ga_xSb_{1-x}$, in which x=0.48–0.52. These high CNR values make it possible to record and read video information of a very high quality.

According to the invention the ratio R/Sb must be close to 50—50, namely between 46 and 54%, as is indicated in formula 1. A small difference from this 50—50 ratio within the above indicated small margin presents advantages. With a value of x lower than 0.46 or higher than 0.54 the rate of crystallization is strongly reduced. The quality of the recorded information also becomes inferior. The content of Q is also of clear importance. With a Q content of more than 6% ($y<0.94$) the rate of crystallization is considerably reduced. Moreover, as a result of this, no complete crystallization in the exposed amorphous area, which is detrimental to the so-called bit definition and signal-to-noise ratio.

The recording materials of the formula $In_xSb_{1-x}$ or $Ga_xSb_{1-x}$ are chemical compounds having a covalent bond between the atoms of the molecule. The substances have a larger melting heat and a comparatively high melting temperature. When these substances are used a crystalline area (bit) can be formed in the amorphous recording layer by means of pulsated laser light having a pulse time smaller than 15 ns.

The amorphous recording layer and the crystalline areas (bits) formed therein are very stable. For example, in a climate test in which the recording element used in the method in accordance with the invention was stored for 1000 hours at a temperature of 65° C. and a relative humidity of 90%, it has been found that no changes had occurred either in the amorphous parts of the crystalline areas (bits) of the recording layer. The stability of the recording element used in method in accordance with the invention can be qualified as being excellent. A life of at least 10 years can be ensured.

It is to be noted that a method of recording pictures on an amorphous film is disclosed in U.S. Pat. No. 3,718,844. In this method the amorphous film is heated in accordance with the picture or pattern to be recorded by means of a controlled energy beam, for example an electron beam or a laser beam. The recording material is, for example, Si, Ge or SiC having a layer thickness of 0.3 to 2.0 μm. Crystalline material is formed in the heated places. By causing a mixture of crystalline and amorphous material to be formed in the heated places, grey shades are possible. The heating times or treatment times of the amorphous material in such a picture recording are comparatively large, at least in the order of magnitude of milliseconds. As a result of said heating a synthetic resin substrate will degrade, deform or acquire a large birefringence. This does not play an important role in this picture recording, for example, when in the form of a photographic picture of transparency, in which comparatively very large dimensions are used. Moreover, according to the embodiment in column 3, lines 31–47 a sapphire substrate is used. In contrast with the process described in said U.S. patent specification, according to the process of the invention binary (digital) recording is realized. In concerns the formation of very small information bits which are provided by means of pulsated laser light with an extremely short pulse time in a comparatively thin layer having a composition according to formula 1. The temperature during the formation of the information bits is comparatively high. The bits can be read by means of laser light, a high signal-to-noise ratio being achieved.

The laser light pulse used in the method in accordance with the invention preferably has a maximum energy content of 1 nJ, the temperature in the exposed places being between the dynamic crystallization temperature and the melting-point of the crystalline recording material.

A suitable pulse energy is, for example, 0.3 nJ. The dynamic crystallization temperature is the temperature of the amorphos recording material at which complete crystallization takes place in a period of time of at most 200 ns. It has been found that in the exposed area a temperature of, for example, 1000°–1200° C. is reached with 0.3 nJ per pulse. Striking is that at this locally very high temperature no degradation or deformation of the synthetic resin occurs.

The invention also relates to an optical recording element which is suitable for use in the above-described method and which is characterized in that the recording element comprises a synthetic resin substrate or a substrate comprising a coating layer of a synthetic resin, that a recording layer is provided on the synthetic resin substrate in a maximum thickness of 150 nm, the recording layer comprising a recording material which satisfies the formula $$[R_x\text{—}Sb_{1-x}]_yQ_{1-y},$$

wherein

R is selected from the group formed by Ga and In,

Q is selected from the group formed by Se and Te, x=0.46–0.54 y=0.94–1.00 or mixtures thereof.

The invention will now be described with reference to the embodiment shown in the drawing, in which FIG. 1 is a cross-sectional view of an optical recording element according to the invention.

EXAMPLE

A substrate 1 (see FIG. 1) of glass having a diameter of 30 cm is provided on one side with a layer 2 of U-V-light-cured monomers based on acrylates. A groove (servo track) has been provided in said synthetic resin layer. A 120 nm thick recording layer 4 of $Ga_xSb_{1-x}$(x=0.48–0.52) is provided on the layer of synthetic resin by means of a sputtering process. The amorphous recording layer is coated with a synthetic resin coating lacquer 5 in a thickness of 10 μm. The optical recording of information is carried out by rotating the disc at a frequency of 4 Hz and exposing the disc at a radius of 70 mm to pulsated laser light which is focused on the recording layer via the supporting plate. The pulse frequency is 800 kHz. The pulse time is 60 ns. The power of the laser is varied from 2 nW to 15 mW so that the pulse energy varies from approximately 0.1 to 0.9 nJ. Crystalline bit 6 having a diameter of approximately 1 μm are formed in the exposed place. The bits are read by means of weak continuous laser light on the basis of differences in reflection between the crystalline bits and the amorphous surroundings. The signal-to-noise ratio was determined in a 10 kHz band width.

Both the amorphous parts of the recording layer and the crystalline bits formed therein are very stable. This means that the optical recording element has a life of at least 10 years. The method described hereinbefore is a so-called "write once" optical recording. Although in principle a reversible process is possible in which the crystalline bits are converted again into amorphous material and the recorded information is erased, the method according to the invention provides such stable crystalline bits that reversion to the amorphous starting material is not considered to be practical.

What is claimed is:

1. A method for the optical nonreversible recording of information in which a recording element which comprises a substrate and a recording layer provided thereon is exposed to laser light which is modulated in accordance with the information to be recorded, in which an optically readable change in structure occurs in the recording layer in the exposed places which is read by means of laser light via the substrate on the basis of reflection differences with the surroundings, characterized in that an amorphous recording layer having the composition $$[R_x\text{—}Sb_{1-x}]_yQ_{1-y} \quad \text{(formula 1)}$$

wherein

R is selected from the group formed by Ga and In,

Q is selected from the group formed by Se and Te, x=0.46–0.54 y=0.94–1.00 or mixtures thereof provided on a snythetic resin substrate in a maximum thickness of 150 nm is exposed to infrared laser light having a wavelength of 750–900 nm which is pulsated in accordance with the binary (digital) information to be recorded with a pulse time of at most 200 ns, a crystalline area (bit) with maximum dimensions of a few micrometers being formed in the amorphous layer in the exposed places.

2. A method as claimed in claim 1, characterized in that an amorphous recording layer of formula 1 is used in which R and y have the meanings given in claim 1, Q is the element tellurium and x=0.48–0.52.

3.

A method as claimed in claim 1, characterized in that an amorphous layer of the formula $$Ga_xSb_{1-x}$$

is used, wherein x=0.48–0.52.

* * * * *